Aug. 30, 1949.　　　E. O. THOMPSON　　　2,480,272
PHONOGRAPH PICKUP DEVICE
Filed Jan. 20, 1944　　　　　　　　　　　　　　2 Sheets-Sheet 1
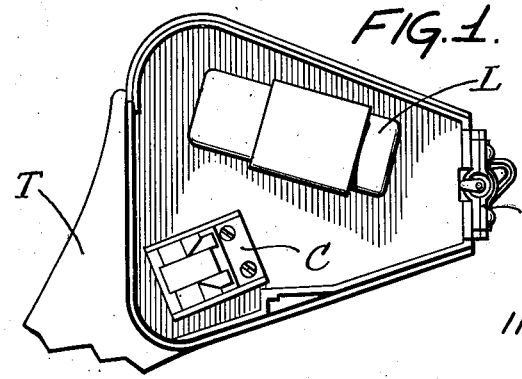
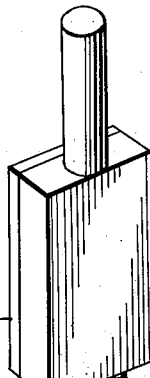
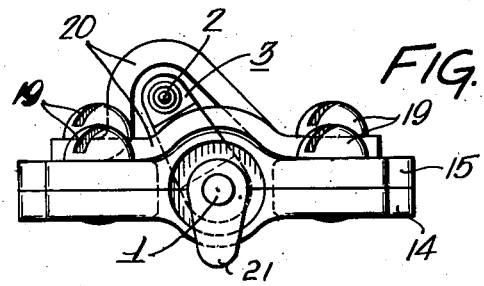
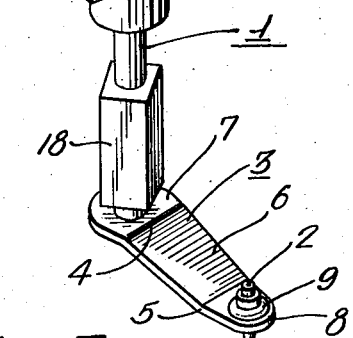
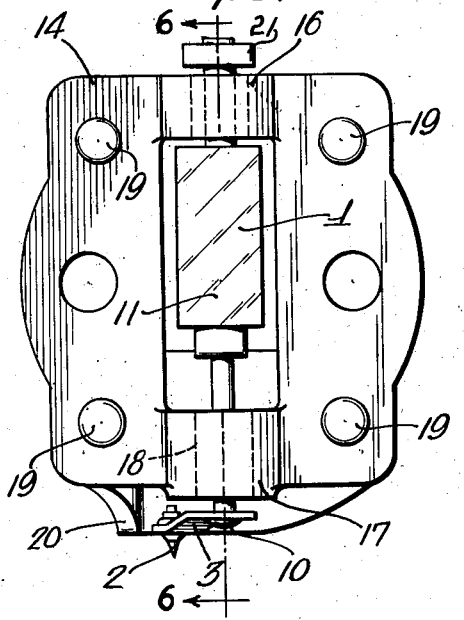
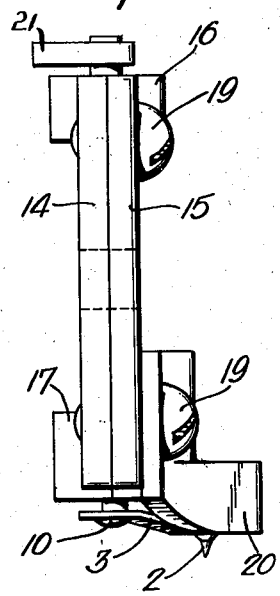
Inventor:
Elmer O. Thompson
by his Attorneys
Howson & Howson Aug. 30, 1949.  E. O. THOMPSON  2,480,272
PHONOGRAPH PICKUP DEVICE
Filed Jan. 20, 1944  2 Sheets-Sheet 2

Inventor:
Elmer O. Thompson
by his Attorneys
Howson & Howson

Patented Aug. 30, 1949

2,480,272

UNITED STATES PATENT OFFICE 2,480,272

PHONOGRAPH PICKUP DEVICE

Elmer O. Thompson, Grasmere, N. Y., assignor, by mesne assignments, to Philco Corporation, Philadelphia, Pa., a corporation of Pennsylvania Application January 20, 1944, Serial No. 519,020

2 Claims. (Cl. 274—38)

This invention relates to a novel sound pick-up device for phonographs. While not limited in its application to sound records having a laterally cut groove, it is preferably so applied as described hereinafter. The subject matter claimed in this application is disclosed but not claimed in copending application Serial No. 357,322, filed September 18, 1940, now Patent No. 2,359,808, issued October 10, 1944.

The principal object of the present invention is to provide a sound pick-up device having a greatly improved frequency response characteristic.

Another object of the invention is to provide a pickup device of novel construction, embodying a novel mechanical resonance feature by which the frequency response of the device is improved over the upper portion of its operating range and the response is caused to cut off sharply at the upper end of said range.

These and other objects are accomplished, according to the invention, by providing a pick-up device in which a vibratile element of predetermined mass is driven by a stylus through a compliant member interconnecting said element and said stylus, and wherein the compliance of the said member is so related to the mass of said vibratile element as to effect mechanical resonance at a predetermined frequency near the upper limit of the desired frequency range of the device. By virtue of such resonance the frequency response of the device is greatly improved, and the device is caused to have a desirable sharp cut off at the upper end of its operating range.

The invention may be fully understood by reference to the accompanying drawings, in which:

Figure 1 is a fragmentary plan view of a tone arm structure embodying one form of the invention, with the cover of the pick-up removed to expose the parts;

Figure 2 is an enlarged perspective view of the vibratile structure employed in the pick-up illustrated;

Figure 3 is an enlarged face view of the assembled vibratile structure and support therefor;

Figure 4 is an enlarged plan view of the same;

Figure 5 is an enlarged side elevational view of the assembled unit;

Figure 6 is an enlarged sectional view taken through the center of the unit along line 6—6 of Fig. 3;

Figure 7:
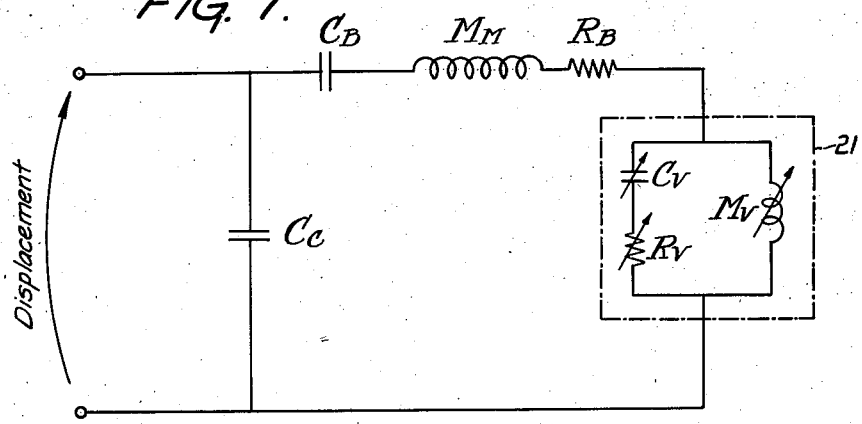
Figure 7 is a diagram illustrating, by way of electrical analogy, the mechanical resonance feature of the device.

In Figure 1 there is illustrated a photoelectric pick-up embodying the present invention. This pick-up is similar to that shown in the above-mentioned parent application, and it comprises a lamp unit L, a light-sensitive cell unit C, and a vibratile structure V, all mounted at the free end of a tone arm T, as illustrated. The present invention, as applied to such a pick-up device, is concerned with the structure of the vibratile unit which is illustrated in Figs. 2 to 6.

Referring to Figure 2, the vibratile structure illustrated therein comprises a rigid shank 1, a stylus 2 laterally offset from the shank 1, and an arm 3 interconnecting the shank and the stylus, which serves to transmit the movements of the stylus to the rigid shank and which also performs the other functions hereinafter described. The arm 3 is formed from a strip of spring material, such as metal, and it has transverse bends 4 and 5, thus providing an inclined body portion 6 and end portions 7 and 8 extending at appreciable angles from the body portion.

The stylus 2 preferably takes the form of a sapphire element mounted on the free end of arm 3 by means of a rivet 9. The other end of arm 3 is attached to the lower end of shank 1 in any suitable manner, as, for example, by means of a rivet 10, as shown more clearly in Figures 3, 5, and 6. In operation, the lateral movements of the stylus, transmitted by the arm 3, cause the shaft 1 to rotate or oscillate about its axis, thereby oscillating a light reflector or mirror 11 mounted on shank 1.

Referring now to Figures 3 to 6, which show the assembled vibratile unit, the structure of Figure 2 is supported by resilient bearings 12 and 13 (see Fig. 6) within a pair of frame members 14 and 15 whose upper and lower portions are formed to provide bearing retainers 16 and 17, respectively. The shank 1 has a non-circular portion 18, and the lower bearing 13 and its retainer 17 are similarly formed so as to normally maintain the light reflector 11 in a predetermined position. Owing to the resilience of the bearings, the shank 1 and the reflector 11 carried thereby are permitted to rotate or oscillate through a small arc in response to lateral movements of the stylus. The entire assembly is held together by means of screws 19 passing through the complementary frame members. A guard 20 is carried by one of the frame members, and the stylus is adapted to recede within the guard under the impetus of the vertical forces. The assembled unit is mounted as a part of the pick-up device as shown in Figure 1.

There is also preferably provided, at the upper end of shank 1, a damping member 21 (see Figures 3 to 6) in the form of a small vane formed of suitable material, such as Viscoloid. This element constitutes an additional component in the mechanical resonance system as will be presently described.

In operation, the arm 3 acts as a compliance between the stylus and the mass driven thereby, since the arm is torsionally deflected by the force moment applied to it by virtue of the lower end of shank 1 being elevated above the driven stylus point. The torsional compliance of arm 3 and the mass of shank 1 and the mirror 11 carried thereby constitute principal components of a mechanical resonance system. Additional components of the system include the compliance of the bearings 12 and 13, and the mass and compliance of the damping member 21.

If desired, the bearing members 12 and 13 may be made of special synthetic rubber, such as Neoprene. The mass of the vibratile structure is preferably made as small as is practical. To this end the shank 1 may be made of aluminum, while the arm 3 may be Phosphor bronze spring material. The operation of the mechanical system and the results obtained thereby may be clearly seen by considering an electrical analogy, as depicted in Figure 7.

Figure 7 shows an electrical circuit diagram comprising elements generally analogous to the components of the pick-up device. In this circuit, current represents velocity and charge represents displacement of the driven mass. $M_m$ is an inductance representing the mass of the vibrating mirror and its supporting shank. $C_c$ and $C_b$ are capacitances representing, respectively, the torsional compliance of arm 3 and the compliance of the resilient bearings 12 and 13. $R_b$ is a resistance representing the internal friction of the bearings. Assuming that the damping element 21 is employed, $M_v$, $C_v$ and $R_v$ represent respectively the mass, compliance and resistance of the Viscoloid damping vane. It will be noted that these last three elements are indicated as being grouped and variable since the relative values of these elements will vary over the frequency range, owing to the nature of the material. Furthermore, the Viscoloid vane is so small physically as to be important only near the resonant frequency of the system.

In the circuit, the velocity through the several arms will divide inversely as the impedance of the arms, and at a given frequency, the displacement of the components will be proportional to the velocity thereof. Hence, the displacement of the driven means in the resonant system of the invention will exceed the displacement in a non-resonant system in which the compliance $C_c$ is not present.

As previously stated, the pick-up device illustrated is of the photoelectric type, as shown in Figure 1 and as disclosed in the aforementioned parent application, in which a barrier cell is employed to generate current in response to light reflected thereon by the pick-up mirror. The response characteristic of the pick-up device over the audio frequency range is illustrated in Figures 8 to 11.

Figure 8:
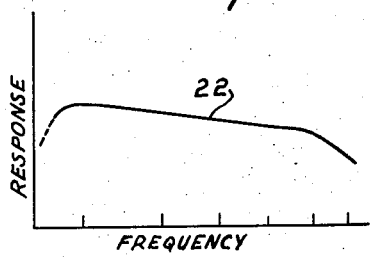
Figures 8 to 11 are explanatory frequency response curves illustrating the improvements in the frequency response characteristic which are obtained by means of the present invention.

The curve 22 of Figure 8 shows the cell output which would be obtained if the stylus were oscillated at a constant amplitude over the audio frequency range in a pick-up having a non-resonant mechanical system. It will be noted that the output or response decreases with increasing frequency.

Figure 9:
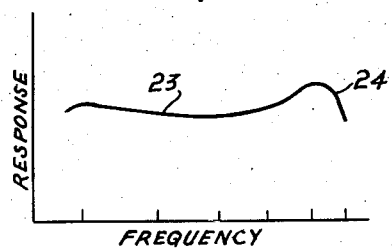

The curve 23 in Figure 9 shows the output of the cell which is obtained under the same conditions employing the resonant mechanical system of the present device. The mechanical resonance in the upper part of the frequency range produces a peak at 24 which increases the response at the higher frequencies and effects a sharp cut off.

Figure 10:
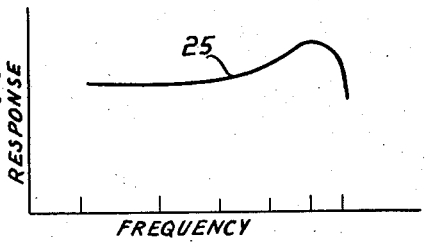
Figure 11:
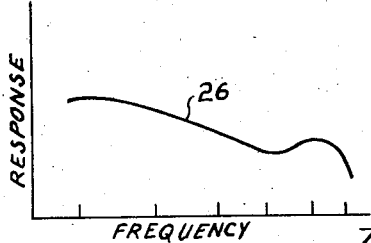

The curve 25 of Figure 10 shows the ratio of the angular displacement of the mirror with respect to the angular displacement of the arm 3. The curve of Figure 10 is derived by subtracting the curve of Figure 8 from that of Figure 9. This shows how the high frequency response is maintained by the use of mechanical resonance. The importance of this will be understood if it is realized that, to obtain a uniform and balanced response in a pick-up without mechanical resonance, it would be necessary to decrease the low frequency response of either the pick-up or the compensating amplifier. To do this would, of course, undesirably decrease the output of the system throughout the entire audio frequency range. Thus the use of mechanical resonance makes possible increased output over the entire audio frequency range of the pick-up with any good amplifier.

In addition, as stated above, the use of resonance provides a sharp cut off of the response characteristic. This cut off substantially eliminates needle scratch and other undesired high audio frequency noises, which might cause cross-modulation in the attendant amplifying system to which the pick-up is connected.

It will be understood, of course, that the response curves will not be the same for records of constant velocity as they will be for records of constant amplitude. The illustrated curves are those obtained with a record of the constant amplitude type. If the pick-up is used with a record of the constant velocity type, the displacement of the needle will not be constant and independent of frequency, and the response will not be as shown in Figures 8 and 9. Instead, the output will decrease with frequency as shown by the curve 26 of Figure 11. This falling response makes necessary the use of a compensating electrical amplifier connected between the pick-up and the sound reproducing device to restore the overall response of the pick-up and amplifier to that shown by Figure 9. Nevertheless, the increased output of the pick-up, by reason of its mechanical resonance, greatly simplifies the problems of amplifier design since any output gained in the pick-up itself need not be compensated for in the amplifier.

As hereinbefore mentioned, the mass of the driven element is of predetermined value $M_m$, and the torsional compliance $C_c$ of arm 3 bears such a relation to said mass that they resonate mechanically at a frequency near the upper limit of the desired frequency range of the device. As will be evident from Figure 2, the length of offset of the stylus and the length and cross-section of the arm 3 are factors which enter into the torsional deformation of the arm by the minute forces applied to the stylus by a record. Hence it will be apparent that the several factors mentioned should be so related as to impart to said arm torsional compliance of such value that the said minute forces are sufficient to effect torsional deformation of the arm, as well as to move the arm for oscillatory actuation of the driven element.

Thus it will be seen that the invention provides a novel pick-up structure in which the constituent elements are so constructed and arranged as to effect mechanical resonance near the upper limit of the desired frequency range of the device so as to greatly improve the frequency response characteristic and to effect a sharp cut off at the upper end of the desired range. Moreover, the compliant arm 3, in addition to serving as a compliance in the mechanical resonance system, protects the stylus and the record against abusive forces by permitting the stylus to recede upward. The provision of the guard 20 also provides additional protection for the stylus.

While the invention has been illustrated as applied to a specific form of device, it is not limited thereto, but may be applied to any phonograph pick-up in which a vibratile mass is driven by a stylus. It will be understood, therefore, that the invention is capable of wide application, and is susceptible to various modifications within the scope of the appended claims.

I claim:

1. A pick-up device for use with sound records having laterally cut grooves, said device comprising a vibratile element adapted to constitute part of a mechano-electric transducer, said element having predetermined mass and being arranged for oscillatory actuation, an actuating arm of negligible mass having one of its end portions in driving association with said element to effect the said oscillatory actuation thereof, and a stylus attached to the other end portion of said arm and offset laterally of said arm so that said arm and said stylus form a torsional couple, the length of said offset and the length and cross-section of said arm being so related as to impart to said arm torsional compliance of such value that the minute forces applied to said stylus—in response to the lateral excursions thereof—not only move said arm for oscillatory actuation of said element but are also sufficient to effect torsional deformation of said arm, the said predetermined mass of said element and the said torsional compliance of said arm bearing a relation one to another such that they resonate mechanically at a frequency near the upper limit of the frequency range of oscillation of said element, whereby the amplitude of oscillation of said element is increased over the upper portion of said range and the oscillation of said element cuts off sharply at the upper end of said range.

2. A pick-up device according to claim 1, in which said arm is composed of a metallic substance having a relatively low energy dissipation characteristic, whereby the resonance peak at the upper portion of said frequency range is relatively sharp, and said device further includes compliant means supporting said element and having a relatively high energy dissipation characteristic.

ELMER O. THOMPSON.

REFERENCES CITED

The following references are of record in the file of this patent:

UNITED STATES PATENTS

| Number | Name | Date |
| --- | --- | --- |
| 761,729 | Tourtel et al. | June 7, 1904 |
| 948,040 | Browning | Feb. 1, 1910 |
| 1,189,152 | Marshall | June 27, 1916 |
| 1,215,744 | Tanner | Feb. 13, 1917 |
| 1,290,295 | Muller | Jan. 7, 1919 |
| 1,490,875 | Wellman | Apr. 15, 1924 |
| 1,678,116 | Harrison | July 24, 1928 |
| 1,689,339 | Harrison | Oct. 30, 1928 |
| 1,739,201 | Ahlstrom | Dec. 10, 1929 |
| 1,905,723 | Landsman | Apr. 25, 1933 |
| 1,995,177 | Guedon | Mar. 19, 1935 |
| 1,996,104 | Forte | Apr. 2, 1935 |
| 2,320,416 | Dally | June 1, 1943 |

FOREIGN PATENTS

| Number | Country | Date |
| --- | --- | --- |
| 231,409 | Great Britain | May 23, 1925 |
| 279,158 | Great Britain | Oct. 19, 1927 |